US007174042B1

(12) United States Patent
Simmons et al.

(10) Patent No.: US 7,174,042 B1
(45) Date of Patent: Feb. 6, 2007

(54) SYSTEM AND METHOD FOR AUTOMATICALLY RECOGNIZING ELECTRONIC HANDWRITING IN AN ELECTRONIC DOCUMENT AND CONVERTING TO TEXT

(75) Inventors: Alex J. Simmons, Seattle, WA (US); Kurt DelBene, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 632 days.

(21) Appl. No.: 10/186,865

(22) Filed: Jun. 28, 2002

(51) Int. Cl.
*G06K 9/00* (2006.01)

(52) U.S. Cl. ............... 382/187; 345/169; 345/179; 382/186; 382/225; 382/321; 715/541

(58) Field of Classification Search ............. 345/173, 345/179, 169, 172; 382/188, 189, 229, 314, 382/186, 187, 321; 715/531, 541, 530, 533
See application file for complete search history.

(56) References Cited

U.S. PATENT DOCUMENTS

| | | | |
|---|---|---|---|
| 2,354,332 A | 7/1944 | Polydoroff | |
| 5,321,768 A | 6/1994 | Fenrich et al. | 382/178 |
| 5,327,342 A * | 7/1994 | Roy | 345/467 |
| 5,339,391 A | 8/1994 | Wroblewski et al. | 345/607 |
| 5,347,295 A | 9/1994 | Agulnick et al. | 345/156 |
| 5,442,742 A | 8/1995 | Greyson et al. | 715/539 |
| 5,491,495 A | 2/1996 | Ward et al. | 345/173 |
| 5,500,937 A | 3/1996 | Thompson-Rohrlich | 715/764 |
| 5,517,578 A | 5/1996 | Altman et al. | 382/181 |
| 5,559,942 A | 9/1996 | Gough et al. | 395/155 |
| 5,583,542 A | 12/1996 | Capps et al. | 345/173 |
| 5,590,257 A | 12/1996 | Forcier | |
| 5,613,019 A | 3/1997 | Altman et al. | 382/311 |
| 5,649,133 A | 7/1997 | Arquie | 715/764 |
| 5,655,136 A | 8/1997 | Morgan | 382/187 |
| 5,760,773 A | 6/1998 | Berman et al. | 715/808 |
| 5,768,418 A * | 6/1998 | Berman et al. | 382/187 |
| 5,809,498 A | 9/1998 | Lopresti et al. | 707/6 |
| 5,838,326 A | 11/1998 | Card et al. | 715/775 |
| 5,838,819 A | 11/1998 | Ruedisueli et al. | 382/187 |
| 5,864,635 A * | 1/1999 | Zetts et al. | 382/187 |
| 5,867,150 A | 2/1999 | Bricklin et al. | |

(Continued)

FOREIGN PATENT DOCUMENTS

| | | |
|---|---|---|
| DE | 40 26 852 A1 | 2/1991 |
| JP | 3-270403 | 12/1991 |

OTHER PUBLICATIONS

Final Official Action dated May 25, 2005 in U.S. Appl. No. 10/186,837.

(Continued)

*Primary Examiner*—Gregory Desire
(74) *Attorney, Agent, or Firm*—Merchant & Gould (57) ABSTRACT

A user can enter handwritten electronic ink into a writing guide on an electronic page of an electronic tablet. An ink processing module can display the handwritten electronic ink as it is rendered on the electronic page by the user. Upon the occurrence of a predefined event, the writing guide module can automatically recognize and convert the electronic ink to text without the user's manual intervention. The writing guide module can replace the electronic ink in the writing guide with the converted text.

12 Claims, 5 Drawing Sheets

U.S. PATENT DOCUMENTS

| | | | |
|---|---|---|---|
| 5,874,957 A | 2/1999 | Cline et al. | 715/786 |
| 5,953,735 A | 9/1999 | Forcier | 715/541 |
| 5,963,208 A | 10/1999 | Dolan et al. | 715/760 |
| 5,970,455 A | 10/1999 | Wilcox et al. | 704/270 |
| 6,061,472 A | 5/2000 | Hullender et al. | 382/187 |
| 6,069,626 A | 5/2000 | Cline et al. | 715/786 |
| 6,081,829 A | 6/2000 | Sidana | |
| 6,108,445 A * | 8/2000 | Uehara | 382/189 |
| 6,128,633 A | 10/2000 | Michelman et al. | 715/525 |
| 6,154,219 A | 11/2000 | Wiley et al. | 345/587 |
| 6,154,758 A * | 11/2000 | Chiang | 715/541 |
| 6,188,405 B1 | 2/2001 | Czerwinski et al. | 715/764 |
| 6,223,145 B1 | 4/2001 | Hearst | 703/22 |
| 6,279,014 B1 | 8/2001 | Schilit et al. | 715/512 |
| 6,295,372 B1 * | 9/2001 | Hawkins et al. | 382/187 |
| 6,304,272 B1 | 10/2001 | Schanel et al. | 345/676 |
| 6,337,698 B1 | 1/2002 | Keely, Jr. et al. | 345/179 |
| 6,340,967 B1 * | 1/2002 | Maxted | 345/173 |
| 6,345,389 B1 * | 2/2002 | Dureau | 725/116 |
| 6,355,889 B1 | 3/2002 | Butcher et al. | 178/18.03 |
| 6,487,567 B1 | 11/2002 | Michelman et al. | |
| 6,487,569 B1 | 11/2002 | Lui et al. | 715/530 |
| 6,529,215 B2 | 3/2003 | Golovchinsky et al. | 715/764 |
| 6,565,611 B1 | 5/2003 | Wilcox et al. | 715/541 |
| 6,594,390 B2 * | 7/2003 | Frink et al. | 382/187 |
| 6,651,221 B1 | 11/2003 | Thompson et al. | 715/541 |
| 6,654,035 B1 | 11/2003 | DeStefano | 345/798 |
| 6,661,409 B2 * | 12/2003 | Demartines et al. | 345/173 |
| 6,678,865 B1 | 1/2004 | Pratley et al. | |
| 6,690,364 B1 * | 2/2004 | Webb | 345/173 |
| 6,741,749 B2 * | 5/2004 | Herbert, Jr. | 382/246 |
| 6,801,190 B1 * | 10/2004 | Robinson et al. | 345/173 |
| 6,833,827 B2 * | 12/2004 | Lui et al. | 345/173 |
| 6,836,759 B1 * | 12/2004 | Williamson et al. | 704/235 |
| 6,989,822 B2 * | 1/2006 | Pettiross et al. | 345/179 |
| 7,002,560 B2 * | 2/2006 | Graham | 345/179 |
| 7,039,234 B2 * | 5/2006 | Geidl et al. | 382/187 |
| 7,079,713 B2 * | 7/2006 | Simmons | 382/321 |
| 2001/0000960 A1 | 5/2001 | Dettloff | |
| 2002/0078035 A1 | 6/2002 | Frank et al. | 707/3 |
| 2002/0097270 A1 | 7/2002 | Keely et al. | 345/764 |
| 2002/0126153 A1 | 9/2002 | Withers et al. | 345/773 |
| 2003/0119469 A1 | 6/2003 | Karr et al. | |
| 2003/0214531 A1 | 11/2003 | Chambers | 345/764 |
| 2003/0215142 A1 | 11/2003 | Gounares et al. | 382/190 |
| 2004/0003350 A1 | 1/2004 | Simmons et al. | 715/517 |

OTHER PUBLICATIONS

Official Action dated Dec. 17, 2004 in U.S. Appl. No. 10/186,837.
Official Action dated Jul. 13, 2005 in U.S. Appl. No. 10/186,812.
Official Action dated Aug. 10, 2005 cited in U.S. Appl. No. 10/186,820.
Wilcox et al., "Dynomite: A Dynamically Organized Ink and Audio Notebook," Computer-Human Interaction, Mar. 27, 1997, pp. 186-193.
Official Action dated Jul. 27, 2005 cited in U.S. Appl. No. 10/186,847.
European Search Report dated Nov. 11, 2005.
U.S. Office Action dated Mar. 1, 2006 cited in U.S. Appl. No. 10/186,837.
U.S. Final Office Action dated Mar. 13, 2006 cited in U.S. Appl. No. 10/186,812.
Thomas Jakobsen, "Advanced Character Physics," 2001, Proceedings, Game Developer's Conference 2001, pp. 1-17.
U.S. Final Official Action date Aug. 10, 2006 cited in U.S. Application No. 10/186,874.
G. Fitzmaurice et al., "Tracking Menus," CHI 2003, vol. 5, No. 2, pp. 71-80, 2003.
Copending Application No. 10/186,837 filed Jun. 28, 2002 entitled "Space Management fo Electronic Documents".
Copending Application No. 10/186,812 filed Jun. 28, 2002 entitled "Resolving Document Object Collisions".
Copending Application No. 10/186,847 filed Jun. 28, 2002 entitled "Method and System for Editing Electronic Ink".
Copending Application No. 10/780,366 filed Feb. 17, 2004 entitled "Writing Guide for a Free-Form Document Editor".
Copending Application No. 10/782,133 filed Feb. 18, 2004 entitled "Glom Widget".
Copending Application No. 10/782,132 filed Feb. 18, 2004 entitled "Tapping to Create Writing".
U.S. Official Action dated Sep. 20, 2005 cited in U.S. Appl. No. 10/186,463.
U.S. Final Official Action dated Mar. 2, 2006 cited in U.S. Appl. No. 10/186,820.
U.S. Official Action dated Jun. 29, 2005 cited in U.S. Appl. No. 10/186,874.
U.S. Offical Action dated Feb. 28, 2005 cited in U.S. Appl. No. 10/186,812.
U.S. Official Action dated Sep. 15, 2006 cited in U.S. Appl. No. 10/186,847.

* cited by examiner

ARCHITECTURE

SYSTEM AND METHOD FOR AUTOMATICALLY RECOGNIZING ELECTRONIC HANDWRITING IN AN ELECTRONIC DOCUMENT AND CONVERTING TO TEXT

RELATED PATENT APPLICATIONS

This patent application is also related to the following non-provisional patent applications: U.S. patent application Ser. No. 10/186,388, entitled "Writing Guide for a Free-Form Document Editor", U.S. patent application Ser. No. 10/186,847, entitled "Method and System for Editing Electronic Ink", U.S. patent application Ser. No. 10,186,874, entitled "Method and System for Selecting Objects on a Display Device", U.S. patent application Ser. No. 10/186,812, entitled "Resolving Document Object Collisions", U.S. patent application Ser. No. 10/186,837 entitled "Space Management for Electronic Documents", U.S. patent application Ser. No. 10/186,820, entitled "Method and System for Categorizing Data Objects with Designation Tools", U.S. patent application Ser. No. 10/186,463, entitled "Method and System for Displaying and Linking Ink Objects with Recognized Text and Objects". These applications and the application herein are all being filed on the same date, Jun. 28, 2002, and are assigned to the Microsoft Corporation. The subject matter of each of these applications is hereby fully incorporated by reference.

TECHNICAL FIELD

The present invention is generally directed to writing on an electronic tablet using electronic ink. More particularly described, the present invention supports automatically recognizing a user's handwriting entered into an electronic document in electronic ink and automatically converting the electronic ink to text upon the occurrence of a predefined event.

BACKGROUND OF THE INVENTION

One of the simplest methods of recording and communicating information is the traditional method of writing the information down on a piece of paper with a writing instrument such as a pen. Writing information by hand on a piece of paper is inexpensive and can be done quickly and easily with little preparation. The traditional method is also flexible in that a writer can generally write in any format anywhere on the page. One of the limitations with handwritten work is that it is not easily manipulated or transferred to other contexts. In other words, changing or transferring a piece of handwritten text typically requires rewriting the text on another medium.

With the widespread use of personal computers, textual information often is recorded using word processing software running on a personal computer. The advantage of such electronic methods of recording information is that the information can be easily stored and transferred to other remote computing devices and electronic media. Such electronically recorded text can also be easily corrected, modified, and manipulated in a variety of different ways.

Typical computer systems, especially computer systems using graphical user interface (GUI) systems such as Microsoft's WINDOWS operating system, are optimized for accepting user input from one or more discrete input devices. Common input devices include a keyboard for entering text and a pointing device, such as a mouse with one or more buttons, for controlling the user interface. The keyboard and mouse interface facilitates creation and modification of electronic documents including text, spreadsheets, database fields, drawings, and photos.

One of the limitations with conventional GUI systems is that a user must generally type the text they are entering into the personal computer using the keyboard. Entering text using a keyboard is generally slower and more cumbersome than handwriting. Although recent advances have been made in reducing the size of personal computers, they are still not as portable and easily accessible as traditional paper and pen. Furthermore, traditional pen and paper provide the user with considerable flexibility for editing a document, recording notes in the margin, and drawing figures and shapes. In some instances, a user may prefer to use a pen to edit a document rather than review the document on-screen because of the ability to make notes freely outside of the confines of the keyboard and mouse interface.

To address the shortcomings of traditional keyboard and mouse interfaces, there have been various attempts to create an electronic tablet that can record handwriting. Such electronic tablets typically comprise a screen and a handheld device that is similar to a pen (or "stylus"). A user can write with the handheld device on the screen of the electronic tablet in a similar manner to traditional pen and paper. The electronic tablet can "read" the strokes of the user's handwriting with the handheld device and recreate the handwriting in electronic form on the screen with "electronic ink." This electronic tablet approach can be employed in a variety of ways including on a personal computer and on a handheld computing device.

Despite the advances in electronic tablets and electronic ink, several limitations still exist with the performance of such electronic handwriting devices. Typically, the placement of an insertion point (or cursor) on an electronic page dictates where electronic ink will be entered by the user. In other words, when a user writes in electronic ink on an electronic tablet, the electronic ink is inserted directly where the insertion point exists on the electronic page. In this way, the insertion point indicates to the user where electronic ink will be inserted on the electronic page once the user starts writing. Therefore, if the user wants to write on another part of the electronic page, the user must first move the insertion point to the spot on the electronic page where the user wants to insert the electronic ink, and then begin writing. Additionally, in the conventional art, as a user writes in electronic ink on an electronic page, the electronic ink remains on the page as electronic ink. If the user wants the electronic ink converted to traditional text (such as the text that appears on a traditional computer screen) at a later time, the user must manually select the electronic ink to be converted and then request that the electronic ink be converted to text. These manual steps are unnecessarily time consuming for the user to perform. Additionally, if a user hand writes a significant amount of information into the electronic document and then later converts the electronic ink to text, the user may find that some of the information could not be converted to text. This may occur if the user's handwriting becomes too illegible or erratic for the electronic tablet to decipher.

Consequently, there is a need in the art for a system and method that will allow a user to write electronic ink anywhere on an electronic page without manually moving the insertion point. Additionally, there is a need in the art for a system and method for automatically recognizing electronic ink as handwriting and converting the electronic ink to text, without manual intervention. Finally, there is a need in the art for a system and method for automatically recognizing and converting electronic ink to text as it is entered by a user and upon the occurrence of a predefined event.

SUMMARY OF THE INVENTION

The present invention can solve the aforementioned problems by providing a system and method for automatically recognizing and converting electronic ink written by a user on an electronic tablet to text. In one aspect of the present invention, a user can enter handwritten electronic ink into a writing guide on an electronic page. A stylus and ink module can display the handwritten electronic ink as it is rendered on the electronic page by the user. A writing guide module can also send the electronic ink to a recognizer upon the occurrence of a predefined event. After the recognizer converts the electronic ink to text, the writing guide module can replace the electronic ink in the writing guide with the text provided by the recognizer. In other words, the writing guide module can insert the converted text in the same location where the electronic ink was written by the user, no matter where the user wrote the electronic ink on the page.

Various aspects of the present invention may be more clearly understood and appreciated from a review of the following detailed description of the disclosed embodiments and by reference to the drawings and claims.

DETAILED DESCRIPTION OF THE EXEMPLARY EMBODIMENTS

The present invention, which can be embodied in one or more program modules that run in a distributed computing environment, enhances the performance of computing devices, such as electronic tablets, that convert a user's handwriting strokes into electronic ink in an electronic document. Specifically, the present invention improves upon the user's ability to review and proof handwritten electronic ink. In one exemplary embodiment of the present invention, upon the occurrence of a predefined event, a user's handwritten electronic ink is automatically recognized and converted to text ink. In this way, the user can ensure that the application can recognize his or her handwriting and properly convert it to text as the user continues to hand write information on the electronic page.

In one exemplary embodiment of the present invention, a user can input handwritten information in electronic ink on an electronic page. As the user writes the information, an exemplary stylus and ink module displays the electronic ink on the page of the electronic tablet. Upon the occurrence of a predefined event, a writing guide module automatically sends the electronic ink to an exemplary recognizer. The recognizer receives the electronic ink from the writing guide module and converts the electronic ink to text ink. Upon receiving the text ink from the recognizer, the writing guide module replaces the electronic ink with the text ink in the exact location on the page where the electronic ink was originally written.

Although the exemplary embodiments will be generally described in the context of a software module and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner.

An exemplary embodiment of the present invention comprises a computer program, which embodies the functions described herein and illustrated in the appended flow charts. However, those skilled in the art recognize that there could be many different ways of implementing the invention in computer programming, and the invention should not be construed as limited to any one set of computer program instructions. Further, a skilled programmer would be able to write such a computer program to implement the disclosed invention without difficulty based on the flow charts and associated description in the application text, for example. Therefore, disclosure of a particular set of program code instructions is not considered necessary for an adequate understanding of how to make and use the invention. The inventive functionality of the claimed computer program will be explained in more detail in the following description in conjunction with the remaining figures illustrating the program flow.

Referring now to the drawings in which like numerals represent like elements throughout the several figures, exemplary embodiments of the present invention and the illustrative operating environment will be described in connection with the drawings.

Figure 1:
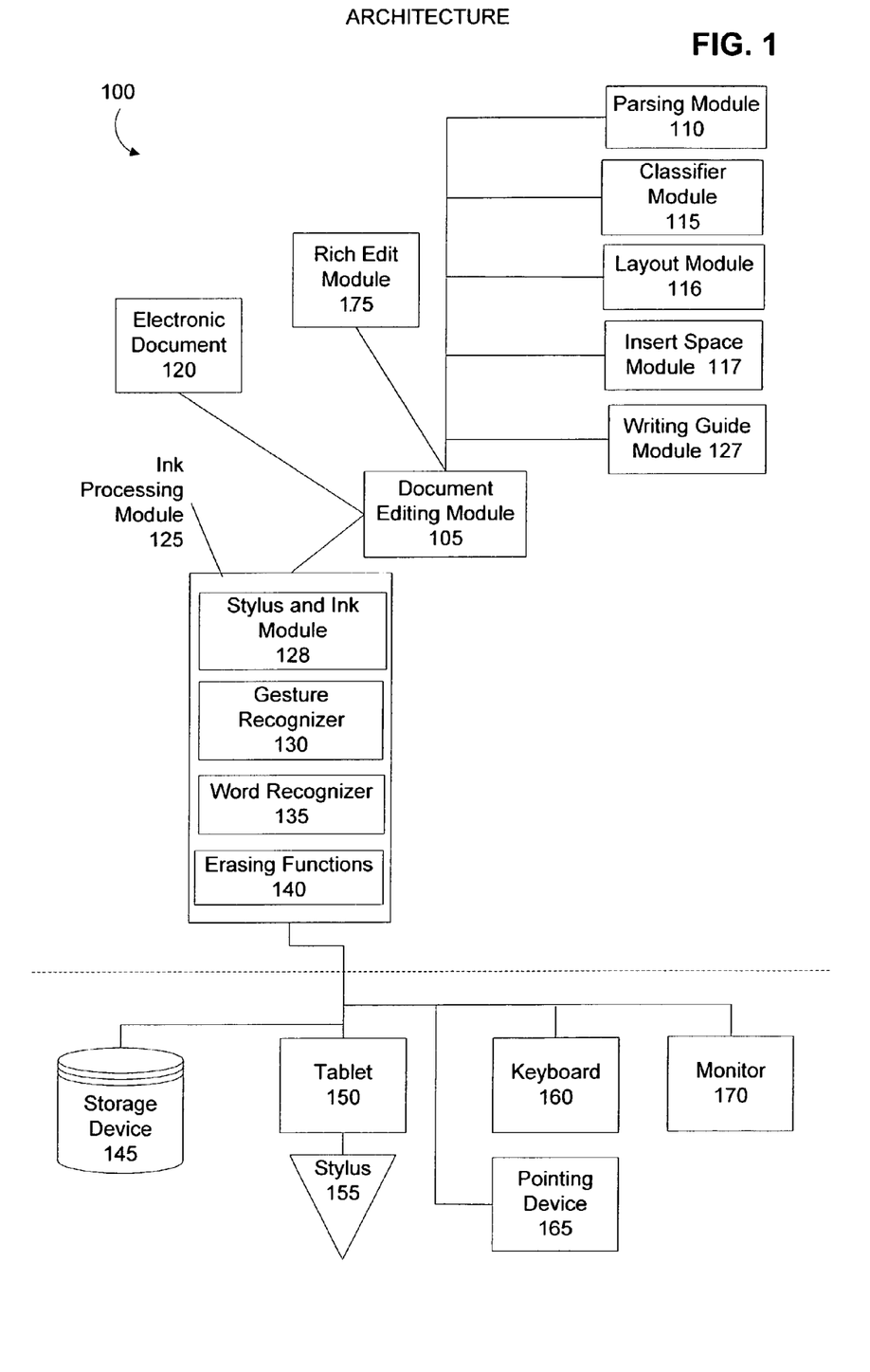
FIG. 1 illustrates an exemplary architecture for writing on an electronic tablet in electronic ink in accordance with an exemplary embodiment of the present invention.

FIG. 1 illustrates an exemplary architecture 100 for writing on an electronic tablet 150 in electronic ink in accordance with an exemplary embodiment of the present invention. FIG. 1 shows typical hardware and software components used in operating the invention from a functional perspective. Conventional input devices are represented by the keyboard 160 and the pointing device (mouse) 165. A user can enter commands and information into a computer using the input devices. Other input devices (not shown) may include a microphone, joystick, game pad, satellite dish, and scanner. A conventional output device, such as monitor 170, is used to display information from the computer. Other output devices (not shown) can include a printer or speaker. Other hardware components shown in FIG. 1 include an electronic tablet 150 and an accompanying stylus 155 or pen. The electronic tablet 150 and stylus 155 are used to input handwriting strokes, which are converted to collections of data that can be represented as electronic ink. The electronic ink may be incorporated into an electronic document 120 and may be displayed on either the electronic tablet 150, the monitor 170, or both. Although the electronic tablet 150 and the monitor 170 are illustrated as being distinct, in the preferred embodiment they are either coupled or form a single component. The joint tablet/ monitor component has the ability to display information and receive input from the stylus 155. Also shown among the hardware components is a conventional electronic storage device 145.

In the representative architecture 100, the hardware components are coupled to an ink processing software module 125. It should be understood by those skilled in the art that FIG. 1 is merely representative and that in practice the hardware components typically are coupled to the elements shown in FIG. 1. The ink processing module 125 is operable for receiving data from the electronic tablet 150 and/or the stylus 155 and rendering that data as electronic ink (or "wet ink"). Wet electronic ink comprises ink that has not been sent to a recognizer to be converted to text. In contrast, "dry ink" comprises electronic wet ink that has been converted to text by a recognizer.

In one exemplary embodiment, the ink processing module 125 comprises a collection of software modules that perform different tasks for rendering handwriting strokes as electronic ink. For example, the stylus and ink module 128 receives data describing the positions and angles of the stylus 155 for a series of handwriting strokes. The stylus and ink module 128 interprets the data for rendering electronic ink. Other software modules, such as a gesture recognizer 130 and word recognizer 135 identify certain handwriting strokes and assign them a particular significance. For example, the word recognizer 135 converts electronic ink to text ink. Specifically, the word recognizer 135 breaks the user's handwriting in electronic ink down into separate word blocks, evaluates the word blocks, and then upon recognizing the word contained in each word block, converts the handwritten word to word-based text (i.e. text that is typically viewed on a computer monitor). Additionally, certain gestures (such as a cross-out) may be recognized and associated with other editing processes. The ink processing module 125 can also include an erasing functions module 140 for removing electronic ink that has been previously rendered.

A document editing module 105 facilitates the manipulation of electronic ink so that a user can create and manipulate an electronic document 120 with greater ease and sophistication. The document editing module 105 typically comprises a collection of software modules for controlling and manipulating electronic ink rendered on the monitor 170. For example, a parsing module 110 identifies handwriting strokes that are selected by the user for editing. Selected strokes may by highlighted or shaded to assist the user in identifying which strokes are to be edited. A classifier module 115 identifies certain handwriting strokes as being part of a word or drawing. Software modules such as the layout module 116 and the insert space module 117 can be designed to control how electronic ink is rendered and moved. A writing guide module 127 facilitates the creation of writing guides, which assist a user in entering information in an electronic document 120 and in converting electronic handwriting to text. The editing modules shown in FIG. 1 are representative, and those skilled in the art understand that other modules can be part of or coupled to the document editing module 105. For example, the document editing module can also work with a rich edit module 175 that provides added functionality.

Certain steps in the processes described below in FIG. 2 through FIG. 5 must naturally precede others for the present invention to function as described. However, the present invention is not limited to the order of the steps described, if such order or sequence does not alter the functionality of the present invention. It is recognized that some steps may be performed before or after other steps without departing from the scope and the spirit of the present invention.

Figure 2:
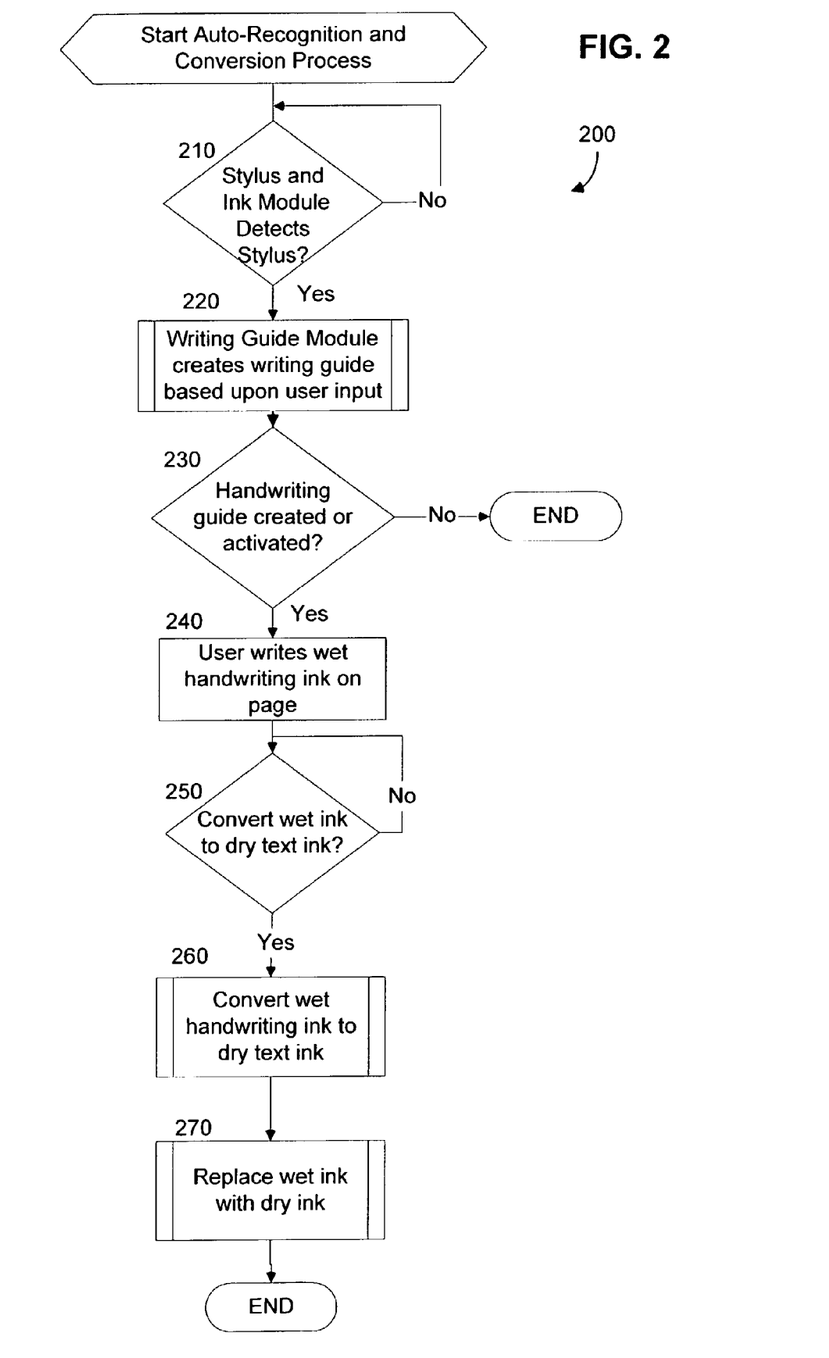
FIG. 2 is a logic flow diagram illustrating an exemplary process for automatically recognizing and converting wet electronic ink to dry text ink in an electronic document.

FIG. 2 is a logic flow diagram illustrating an exemplary process 200 for automatically recognizing and converting wet electronic ink to dry text ink in an electronic document 120. Step 210 is the first step in the exemplary process 200. In Step 210, the stylus and ink module 128 determines whether it has detected a stylus 155, or other handheld device, on or near the input screen of the electronic tablet 150. More specifically, the stylus and ink module 128 will detect a stylus 155 if a user touches the input screen of the electronic tablet 150 with the stylus 155. The stylus and ink module 128 will also detect a stylus 155 near the electronic tablet 150 if the user allows the stylus 155 to hover near or over the input screen of the electronic tablet 150.

If the stylus and ink module 128 has detected a stylus 155 on or near the input screen of the electronic tablet 150, then in Step 220, the writing guide module 127 creates a writing guide based upon the user's stroke input into an electronic document 120 on the electronic tablet 150. A writing guide visually guides the user in entering his or her information by showing the user the structure of the information to be entered. A writing guide can comprise a handwriting writing guide (for electronic handwritten notes) or a drawing guide (for creating drawings). As the user enters strokes on the input screen, the classifier module 115 determines whether the guide to be created should comprise a drawing guide or a handwriting writing guide. In other words, if it appears to the classifier module 115 that the user is entering handwriting onto the input screen, then the writing guide module 127 creates a handwriting writing guide. On the other hand, if it appears to the classifier module 115 that the user is drawing on the input screen, then the writing guide module 127 creates a drawing guide. In one exemplary embodiment, the classifier module 115 makes this determination based upon the size of the input strokes made by the user, the number of strokes made by the user, and the aspect ratio of the strokes made by the user. In another exemplary embodiment, the classifier module 115 makes this determination based upon any other type of user input. For example, a user can select a particular handwriting pen from a set of handwriting pens that have particular pre-defined formatting characteristics for electronic ink. In this way, if the user selects a handwriting pen before writing on the electronic tablet 150, then the classifier module 115 knows automatically that the user will be entering handwriting onto the electronic page.

In Step 230, if the writing guide module 127 created a drawing guide or activated an existing drawing guide, then the process ends because a drawing does not need to be converted to text. However, if the writing guide module 127 created a handwriting writing guide or activated an existing handwriting writing guide as a result of the user's input, then in Step 240, the user continues to write electronic wet ink on the electronic page.

In Step 250, the writing guide module 127 determines whether the wet electronic ink should be automatically converted to text. In one exemplary embodiment, a user can select to write with an "Auto-Recognition" handwriting pen on the electronic tablet 150. If the user writes with an "Auto-Recognition" pen, then the document editing module 105 knows that the user wants his electronic ink to be automatically recognized and converted to text upon the occurrence of a particular event. In one exemplary embodiment, the occurrence of the following events will trigger the automatic conversion of wet electronic ink to dry text ink: the user enters enough input strokes to fill one line of the writing guide; the user changes its focus from the electronic document 120 to another application window; or a user moves the stylus 155 away from the current writing guide to another location on the electronic tablet 150.

If the writing guide module 127 determines that the wet electronic ink should be automatically converted to text, then in Step 260, the writing guide module 127 sends the wet handwriting ink to the word recognizer 135 to be converted to dry text ink. Then, in Step 270, upon receiving the converted text back from the word recognizer 135, the writing guide module 127 replaces the wet electronic ink in the writing guide with the dry text ink received from the word recognizer 135.

Figure 3:
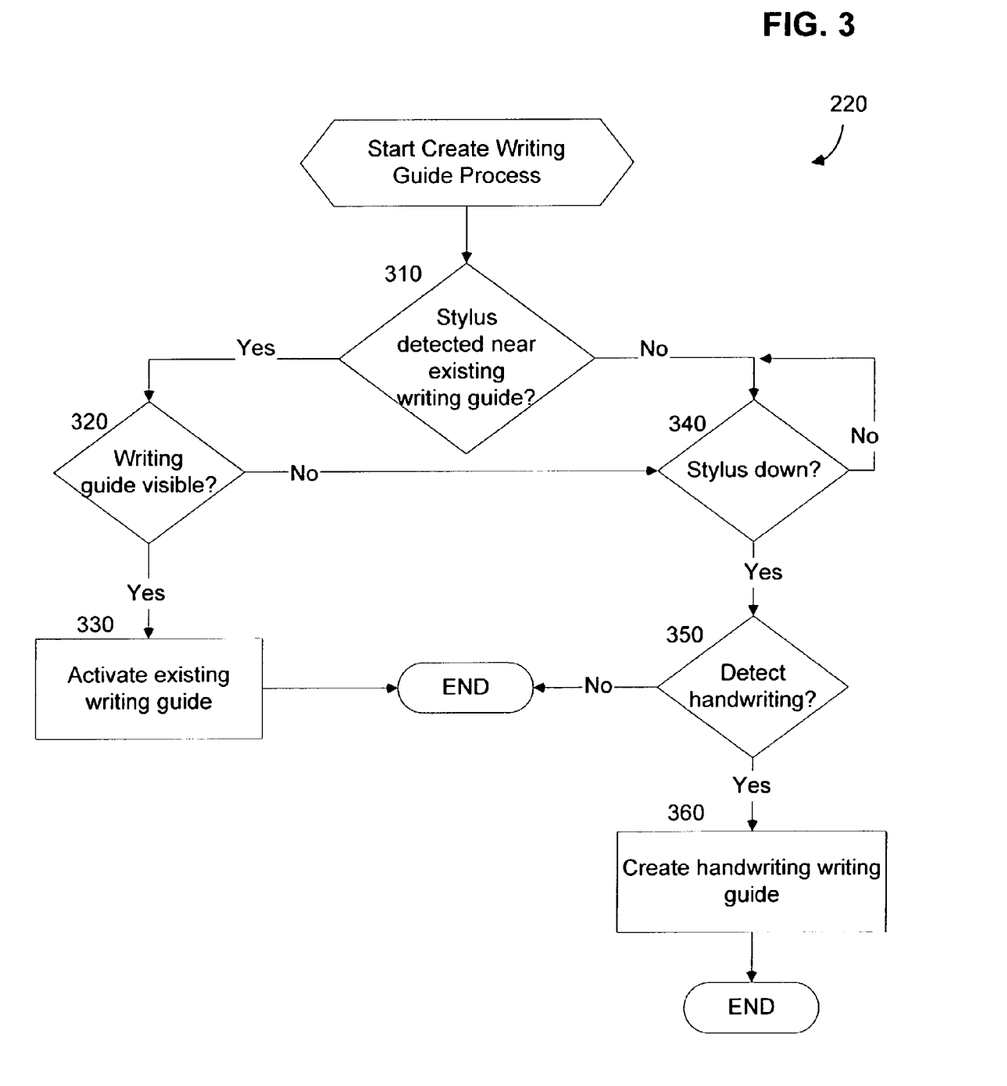
FIG. 3 is a logic flow diagram illustrating an exemplary process for creating a writing guide based upon the user's stroke input on the input screen of the electronic tablet.

FIG. 3 is a logic flow diagram illustrating an exemplary process 220 for creating a writing guide based upon the user's stroke input on the input screen of the electronic tablet 150. Step 310 is the first step in the exemplary process 220. In Step 310, the writing guide module 127 determines whether the stylus 155 was detected near an existing writing guide on the electronic page. If the writing guide module 127 determines that the stylus 155 was detected near an existing writing guide, then in Step 320, the writing guide module 127 determines whether the stylus 155 is sufficiently close to the existing writing guide. Specifically, a virtual insertion point exists at the end of each handwriting writing guide. If the stylus 155 is proximate to or touches the screen near the virtual insertion point, then the writing guide "activates," such that the user can add information to the content already existing in the writing guide. Thus, the stylus 155 is "sufficiently close" to the writing guide if it is close enough to activate it. If in Step 320, the writing guide module 127 determines that the stylus 155 is sufficiently close to the existing writing guide (i.e., the writing guide is "visible"), then in Step 330, the writing guide module 127 activates the existing writing guide on the electronic page.

However, if in Step 320, a writing guide is not visible, or if in Step 310, the writing guide module 127 does not detect the stylus 155 near any writing guides that currently exist on the electronic page, then in Step 340, the stylus and ink module 128 determines whether the user has physically touched the stylus 155 to the input screen of the electronic tablet 150. If the stylus 155 has been placed directly on the input screen, then in Step 350, the classifier module 115 determines whether the user is inputting handwriting or a drawing. As discussed above, this determination can be made upon evaluating a number of factors. In one exemplary embodiment, these factors include the number of input strokes entered by the user, the height of the input strokes, and the aspect ratio of the input strokes. If in Step 350, the classifier module 115 determines that the user is inputting a drawing, or if it cannot recognize the input provided by the user, then the process ends. However, if in Step 350, the classifier module 115 detects that the user is entering handwriting onto the electronic page, then in Step 360, the writing guide module 127 creates a handwriting writing guide.

Figure 4:
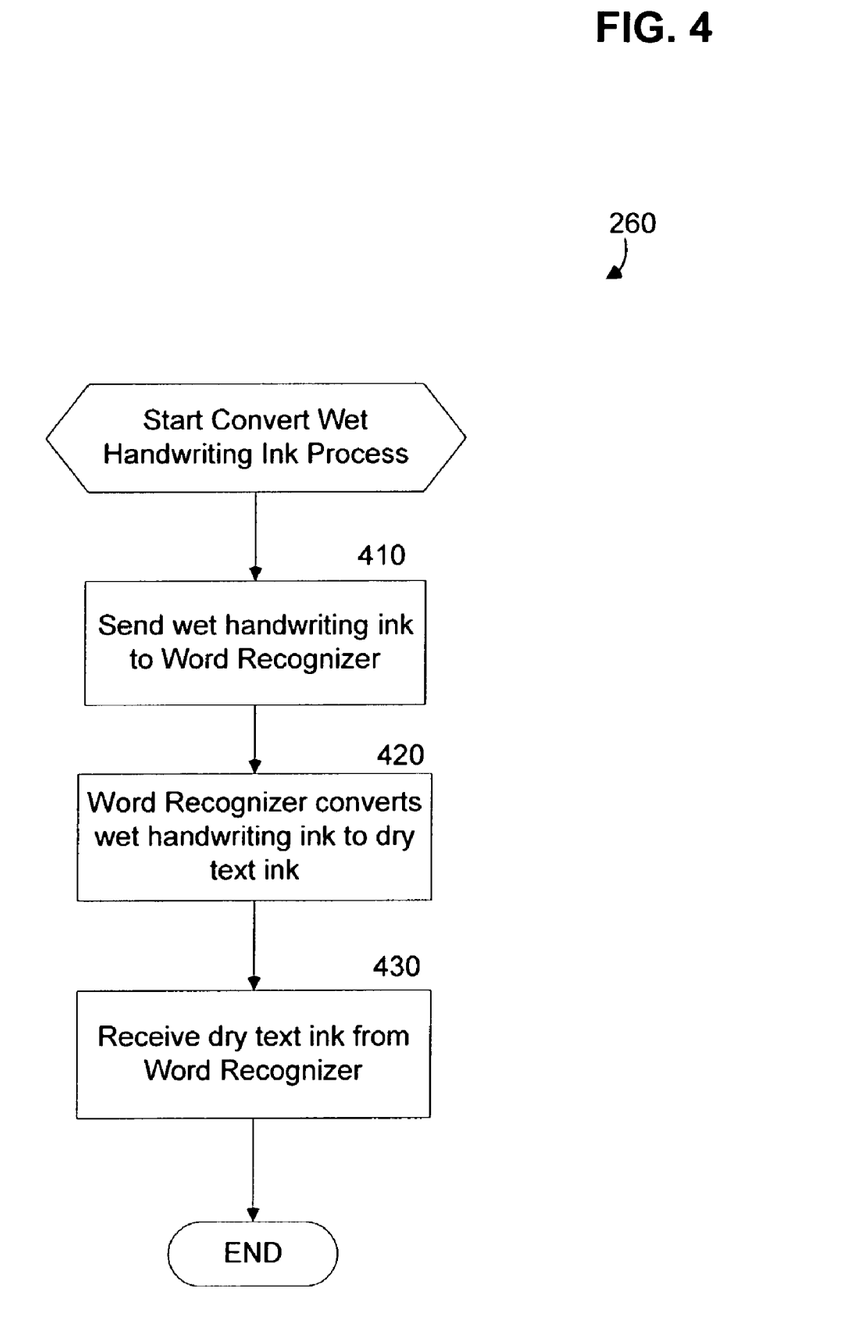
FIG. 4 is a logic flow diagram illustrating an exemplary process for automatically converting wet handwriting ink to dry text ink using a word recognizer.

FIG. 4 is a logic flow diagram illustrating an exemplary process 260 for automatically converting wet handwriting ink to dry text ink using a word recognizer 135. Step 410 is the first step in the exemplary process 260. In Step 410, upon the occurrence of a particular event, the writing guide module 127 sends the wet handwriting ink to the word recognizer 135. Therefore, in one exemplary embodiment, if the user fills a line of the writing guide with electronic ink, if the user moves the stylus 155 away from the active writing guide, or if the user switches to another application, then the writing guide module 127 sends the wet ink to the word recognizer 135 for conversion to text. In Step 420, the word recognizer 135 converts the wet handwriting ink to dry text ink. In Step 430, once the word recognizer 135 has converted the wet handwriting ink to dry text ink, the writing guide module 127 receives the dry text ink from the word recognizer 135.

Figure 5:
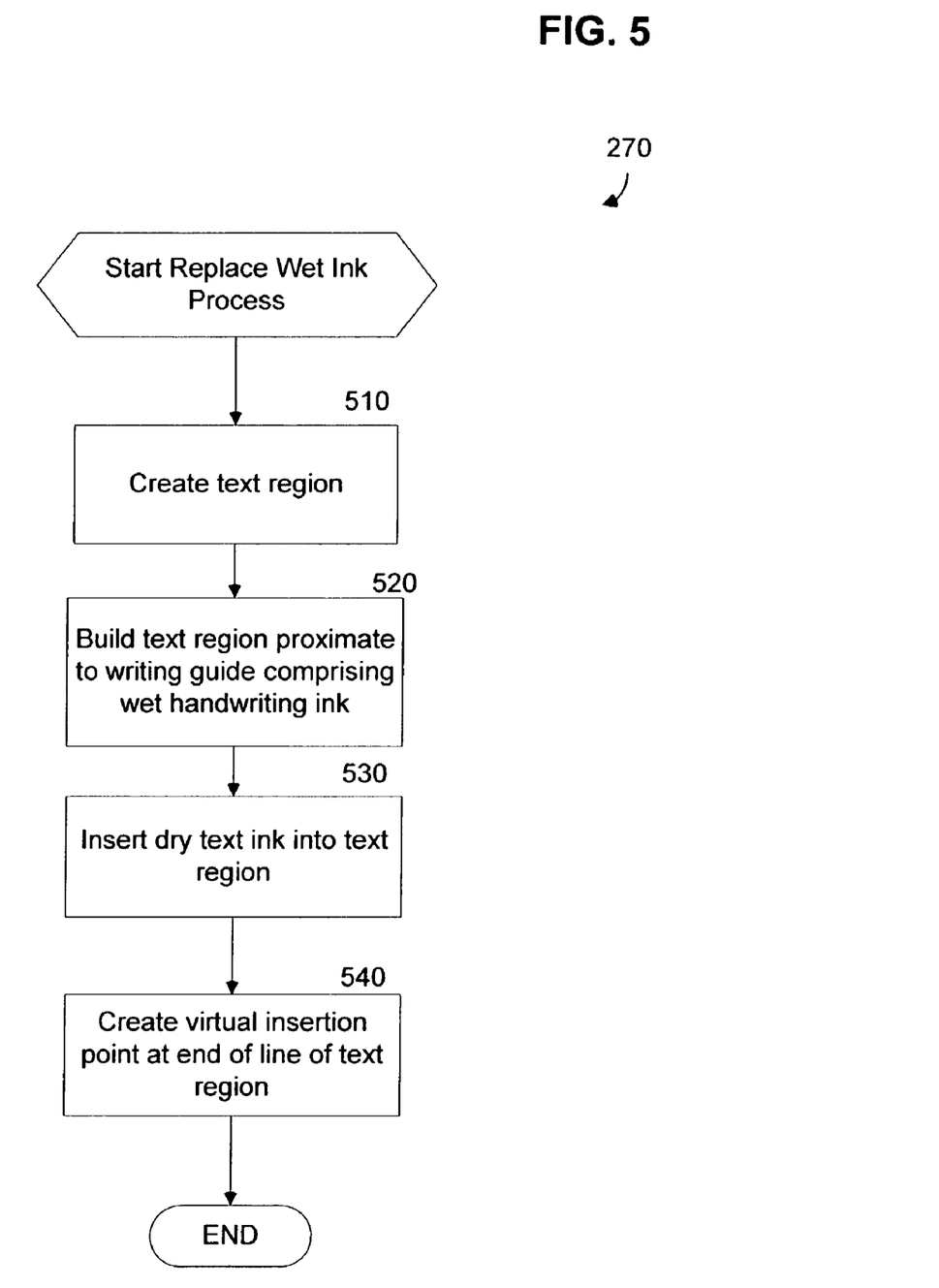
FIG. 5 is a logic flow diagram illustrating an exemplary process for automatically replacing wet electronic ink entered by a user into a writing guide with dry text ink.

FIG. 5 is a logic flow diagram illustrating an exemplary process 270 for automatically replacing wet electronic ink entered by a user into a writing guide with dry text ink. Step 510 is the first step in the exemplary process 270. In Step 510, the writing guide module 127 creates a text region. In Step 520, writing guide module 127 builds the text region proximate to the location where the wet handwriting ink was originally written by the user on the electronic page. In other words, the writing guide module 127 builds the text region around the writing guide comprising the wet handwriting ink. In Step 530, the writing guide module 127 replaces the wet electronic ink with the dry text ink in the text region on the electronic page. Then, in Step 540, the writing guide module 127 creates a virtual insertion point at the end of the line of the dry text ink.

It should be understood that the foregoing relates only to illustrative embodiments of the present invention, and that numerous changes may be made therein without departing from the scope and spirit of the invention as defined by the following claims.

We claim:

1. A method for automatically recognizing and converting electronic ink to text, comprising the steps of:
   detecting a handheld device proximate to a surface of an electronic tablet, wherein a user uses the handheld device to enter electronic ink on the electronic tablet;
   determining if the user is using the handheld device to enter handwriting based upon at least one of the following characteristics of the entered electronic ink: the size of input strokes comprising the entered electronic ink, the number of the input strokes comprising the entered electronic ink, and the aspect ratio of the input strokes comprising the entered electronic ink;
   if the user is using the handheld device to enter handwriting, creating a handwriting writing guide in which the user enters the electronic ink;
   in response to an occurrence of a predefined event, converting the electronic ink to text; and
   replacing the electronic ink with the text in the handwriting writing guide.

2. The method of claim 1, wherein the converting step comprises the steps of:
   sending the electronic ink to a recognizer; and
   converting the electronic ink to the text at the recognizer.

3. The method of claim 2, wherein the replacing step comprises the steps of:
   creating the text region by building a text region around the handwriting writing guide in which the electronic ink was written by the user; and
   inserting the text received from the recognizer into the text region.

4. The method of claim 3, wherein the replacing step further comprises the step of creating a virtual insertion point at an end of the text region.

5. A method for automatically converting electronic ink to text, comprising the steps of:
   detecting a stroke input by a user on an electronic tablet based upon a motion of a stylus on the electronic tablet, wherein the stroke input represents the motion of the stylus;
   converting the stroke input to electronic ink;
   displaying the electronic ink to the user;

determining if the electronic ink comprises handwriting based upon at least one of the following characteristics of the stroke input: the size of input strokes comprising the stroke input, a number of the input strokes comprising the stroke input, and the aspect ratio of the stroke input; and if the electronic ink comprises handwriting, automatically converting the electronic ink to text, without manual intervention by the user, in response to an occurrence of a predefined event.

6. The method for automatically converting electronic ink of claim 5, wherein the detecting step further comprises the steps of:

inserting the electronic ink in an existing writing guide, if the stroke input is proximate to the existing writing guide, else creating a new writing guide and inserting the electronic ink in the new writing guide.

7. The method for automatically converting electronic ink of claim 5, wherein the converting step comprises the steps of:

automatically issuing a request to convert the electronic ink to text, in response to the occurrence of the predefined event; and converting the electronic ink to text, in response to receiving the request.

8. The method for automatically converting electronic ink of claim 6, further comprising the steps of:

creating a text region by building the text region around the writing guide in which the electronic ink was written by the user; and inserting the text into the text region.

9. The method for automatically converting electronic ink of claim 8, further comprising the step of creating a virtual insertion point at an end of the text region.

10. A method for automatically recognizing and converting electronic ink to text, comprising the steps of:

detecting a handheld device proximate to a surface of an electronic tablet, wherein a user uses the handheld device to enter electronic ink on the electronic tablet;

determining if the user is using the handheld device to enter handwriting based upon at least one of the following characteristics of the entered electronic ink: the size of input strokes comprising the entered electronic ink, the number of the input strokes comprising the entered electronic ink, and the aspect ratio of the input strokes comprising the entered electronic ink;

if the user is using the handheld device to enter handwriting, creating a handwriting writing guide in which the user enters the electronic ink, in response to an occurrence of a predefined event,
sending the electronic ink to a recognizer, and
converting the electronic ink to the text at the recognizer; and replacing the electronic ink with the text in the handwriting writing guide.

11. The method of claim 10, wherein the replacing step comprises the steps of:

creating a text region by building a text region around the handwriting writing guide in which the electronic ink was written by the user; and inserting the text received from the recognizer into the text region.

12. The method of claim 11, wherein the replacing step further comprises the step of creating a virtual insertion point at an end of the text region.

* * * * *